(12) United States Patent
Shimura et al.

(10) Patent No.: US 8,107,121 B2
(45) Date of Patent: Jan. 31, 2012

(54) IMAGE PROCESSING DEVICE, IMAGE PROCESSING METHOD, AND RECORDING METHOD FOR MANAGING LOG OF OUTPUT IMAGE DATA

(75) Inventors: Hiroshi Shimura, Kanagawa (JP); Masaaki Ishikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 597 days.

(21) Appl. No.: 12/289,652

(22) Filed: Oct. 31, 2008

(65) Prior Publication Data

US 2009/0116077 A1 May 7, 2009

(30) Foreign Application Priority Data

Nov. 2, 2007 (JP) ................................. 2007-286728
Oct. 3, 2008 (JP) ................................. 2008-258780

(51) Int. Cl.
*G06K 15/00* (2006.01)
*H04N 1/00* (2006.01)
*G06F 3/12* (2006.01)
(52) U.S. Cl. .......................... 358/1.18; 358/1.15; 358/1.6
(58) Field of Classification Search .................. 358/1.6, 358/1.15, 1.18
See application file for complete search history.

(56) References Cited

U.S. PATENT DOCUMENTS

| | | | | |
|---|---|---|---|---|
| 5,640,647 | A * | 6/1997 | Hube | 399/84 |
| 6,185,321 | B1 * | 2/2001 | Fukushima et al. | 382/135 |
| 6,192,165 | B1 * | 2/2001 | Irons | 382/306 |
| 2006/0214963 | A1 | 9/2006 | Komatsu | |
| 2007/0013962 | A1 * | 1/2007 | Hayashi | 358/403 |
| 2007/0133054 | A1 | 6/2007 | Kobayashi et al. | |
| 2007/0258098 | A1 | 11/2007 | Matsushima | |
| 2008/0055633 | A1 | 3/2008 | Kajiyama et al. | |

FOREIGN PATENT DOCUMENTS

| | | |
|---|---|---|
| JP | 3252563 | 11/2001 |
| JP | 2004-164538 | 6/2004 |
| JP | 2004-200962 | 7/2004 |
| JP | 2006-135630 | 5/2006 |
| JP | 2007-080038 | 3/2007 |

OTHER PUBLICATIONS

European Search Report.
Abstract of JP 07-114299 published May 2, 1995.

* cited by examiner

*Primary Examiner* — Charlotte M Baker
*Assistant Examiner* — Fred Guillermety
(74) *Attorney, Agent, or Firm* — Harness, Dickey & Pierce, P.L.C.

(57) ABSTRACT

In a data processing device, an additional information acquiring unit is configured to acquire, from a plurality of input image data items, respective items of additional information relevant to the plurality of input image data items. A log management unit is configured to manage a log of output image data, wherein, when the plurality of input image data items are integrated into an output image data, the log management unit manages respective items of additional information acquired from the plurality of input image data items contained in the output image data, as a log of the output image data.

10 Claims, 10 Drawing Sheets

| FUNCTION | COMBINATION OF FILTERS |
|---|---|
| COPY | READING FILTER+DOC. PROCESSING FILTER+PRINTING FILTER |
| PRINT | PC DOC. RECEIVING FILTER+DOC. CONVERTING FILTER+PRINTING FILTER |
| SCAN_TO_E-MAIL | READING FILTER+E-MAIL TRANSMITTING FILTER |
| FAX_TRANSMIT | READING FILTER+FAX TRANSMITTING FILTER |
| FAX_RECEIVE | FAX RECEIVING FILTER+PRINTING FILTER |
| DOC. BOX STORE | READING FILTER+STORED DOC. REGISTERING FILTER |
| DOC. BOX PRINT | STORED DOC. READING FILTER+PRINTING FILTER |

| IMAGE DATA | DATE/TIME | OPERATOR | APPLICATION USED | OTHER | CONTROL CODES |
|---|---|---|---|---|---|
| (INPUT IMAGE DATA)<br>IMAGE DATA<br>CONTROL CODE 3 | 2007/10/24 10:32 | USER-123456 | COPY | ... | 3 |
| (OUTPUT IMAGE DATA)<br>IMAGE DATA / CONTROL CODE 1   IMAGE DATA / CONTROL CODE 2<br>IMAGE DATA (COLOR FILL) / CONTROL CODE 3   IMAGE DATA / CONTROL CODE 4 | 2007/10/24 10:32 | USER-123456 | COPY | ... | 1, 2, 3, 4 |

FIG.8

| OUTPUT IMAGE DATA | DATE/TIME | OPERATOR | APPLICATION USED | OTHER | CONTROL CODES |
|---|---|---|---|---|---|
| IMAGE DATA / CONTROL CODE 1 ; IMAGE DATA / CONTROL CODE 2 ; IMAGE DATA / CONTROL CODE 1 ; IMAGE DATA / CONTROL CODE 4 | 2007/10/24 10:32 | USER-123456 | COPY | ... | 1, 2, -1, 4 |

FIG.9

IMAGE PROCESSING DEVICE, IMAGE PROCESSING METHOD, AND RECORDING METHOD FOR MANAGING LOG OF OUTPUT IMAGE DATA

BACKGROUND OF THE INVENTION

1. Field of the Invention

This invention relates to an image processing device which manages a log of output image data.

2. Description of the Related Art

In recent years, the protection of confidential information is an important issue, and various methods are proposed for the prevention of leaking of confidential information.

As one of such methods, Japanese Laid-Open Patent Application No. 2007-080038 discloses a method of storing a log of output data. In this method, important words contained in print data are extracted, and the extracted words are managed as a print log of the print data together with a thumbnail of the print data. According to this method, it is possible to promptly identify the print data by the print log even if the print data leaks out. The important words may include the information which indicates personal names or addresses existing in print data, whose confidentiality should be protected, and the information labeled "important" which indicates the print data attributes.

The method of Japanese Laid-Open Patent Application No. 2007-080038 is arranged to generate a print log from the data extracted from a single print data item. For example, when a log of print data integrated from two or more image data items is generated, a print log is generated from the data extracted from a single print data item integrated from the two or more image data items.

In the case of the method of Japanese Laid-Open Patent Application No. 2007-080038, when an integrated output image data is generated from two or more image data items, log information is generated only from the data extracted from the integrated output image data. Namely, extracting information from each of the respective image data items contained in the output image data is impossible, and log management for the respective image data items is impossible.

SUMMARY OF THE INVENTION

In one aspect of the invention, the present disclosure provides an improved image processing device and method in which the above-described problems are eliminated.

In one aspect of the invention, the present disclosure provides an image processing device and method capable of performing accurate log management of output image data.

In an embodiment of the invention which solves or reduces one or more of the above-mentioned problems, the present disclosure provides an image processing device which manages a log of output image data, the image processing device comprising: an additional information acquiring unit configured to acquire, from a plurality of input image data items, respective items of additional information relevant to the plurality of input image data items; and a log management unit configured to manage a log of output image data, wherein, when the plurality of input image data items are integrated into an output image data, the log management unit manages respective items of additional information acquired from the plurality of input image data items contained in the output image data, as a log of the output image data.

The above-mentioned image processing device may be arranged to further comprise a storing unit which stores the respective items of additional information acquired by the additional information acquiring unit, and the log management unit is configured to manage the respective items of additional information stored in the storing unit as a log of the output image data.

The above-mentioned image processing device may be arranged so that the log management unit is configured to manage the input image data items and the acquired additional information items associated with the input image data items, as a log of the output image data.

The above-mentioned image processing device may be arranged so that each of the additional information items includes a control code which indicates a process to be performed for corresponding one of the input image data items, and the log management unit is configured to manage the input image data items before processes indicated by respective control codes in the additional information items are performed, and the output image data containing the input image data items after the processes indicated by the respective control codes are performed, as a log of the output image data.

The above-mentioned image processing device may be arranged so that, when the additional information acquiring unit is not able to acquire additional information from an input image data item, the log management unit manages information indicating that no additional information is acquired, as a log of the output image data.

In an embodiment of the invention which solves or reduces one or more of the above-mentioned problems, the present disclosure provides an image processing method which manages a log of output image data, the image processing method comprising: an additional information acquiring step of acquiring, from a plurality of input image data items, respective items of additional information relevant to the plurality of input image data items; and a log management step of managing a log of output image data, wherein, when the plurality of input image data items are integrated into an output image data, the log management step is configured to manage respective items of additional information acquired from the plurality of input image data items contained in the output image data, as a log of the output image data.

In an embodiment of the invention which solves or reduces one or more of the above-mentioned problems, the present disclosure provides a computer-readable recording medium storing an image processing program which, when executed by a computer, causes the computer to perform an image processing method which manages a log of output image data, the image processing method comprising: an additional information acquiring step of acquiring, from a plurality of input image data items, respective items of additional information relevant to the plurality of input image data items; and a log management step of managing a log of output image data, wherein, when the plurality of input image data items are integrated into an output image data, the log management step is configured to manage respective items of additional information acquired from the plurality of input image data items contained in the output image data, as a log of the output image data.

According to the image processing device and the image processing method of the embodiments of the invention, it is possible to carry out accurate log management of output image data.

Other objects, features and advantages of the present invention will become more apparent from the following detailed description when read in conjunction with the accompanying drawings.

DETAILED DESCRIPTION OF THE PREFERRED EMBODIMENTS

A description will be given of embodiments of the invention with reference to the accompanying drawings.

Figure 1:
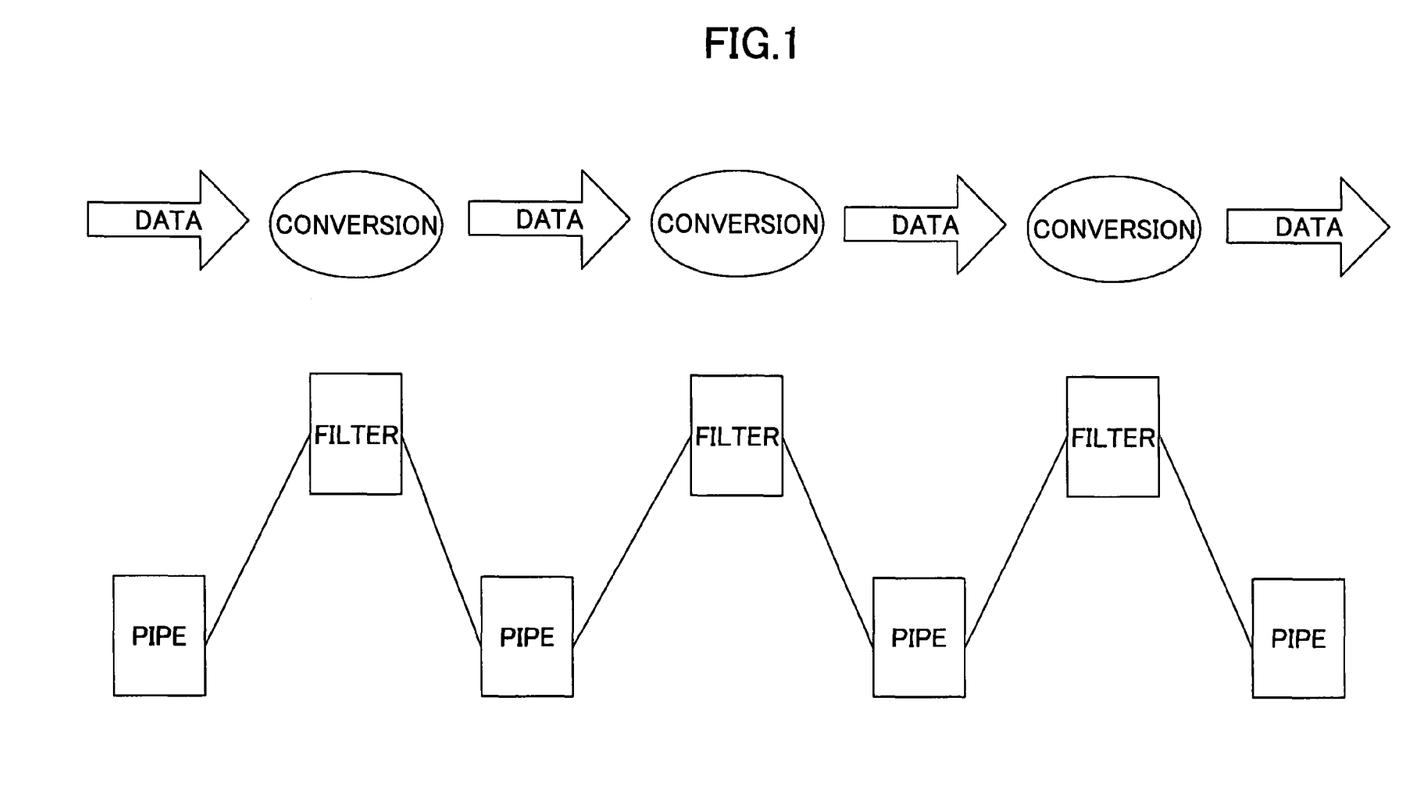
FIG. 1 is a diagram for explaining the concept of a pipe and filter architecture.

The concept of a pipe and filter architecture adopted in the software architecture of a multi-function peripheral which is an embodiment of the image processing device of the invention will be described. FIG. 1 is a diagram for explaining the concept of the pipe and filter architecture.

As shown in FIG. 1, filters are connected by pipes respectively. Each filter receives input image data, converts the input image data, and outputs the resulting image data. Each pipe transfers the image data output from a filter to the following filter.

Each of the functions arranged in the multi-function peripheral of the present embodiment may be regarded as a series of conversions of document data (image data). Each function of the multi-function peripheral may be generalized into inputting of document data, processing of the input document data, and outputting of the processed document data. If the inputting, the processing, and the outputting are regarded as conversions, a software component which carries out one conversion may constitute a filter.

Specifically, a filter which carries out the inputting of document data is called input filter, a filter which carries out the processing of the input document data is called processing filter, and a filter which carries out the outputting of the processed document data is called output filter.

These filters are independent of each other, and, fundamentally, there is no dependent relationship between the filters (or there is no calling or called relationship between the filters. Therefore, the addition (installation) or deletion (uninstallation) of filters per filter in the software of the multi-function peripheral of the present embodiment may be carried out.

Figure 2:
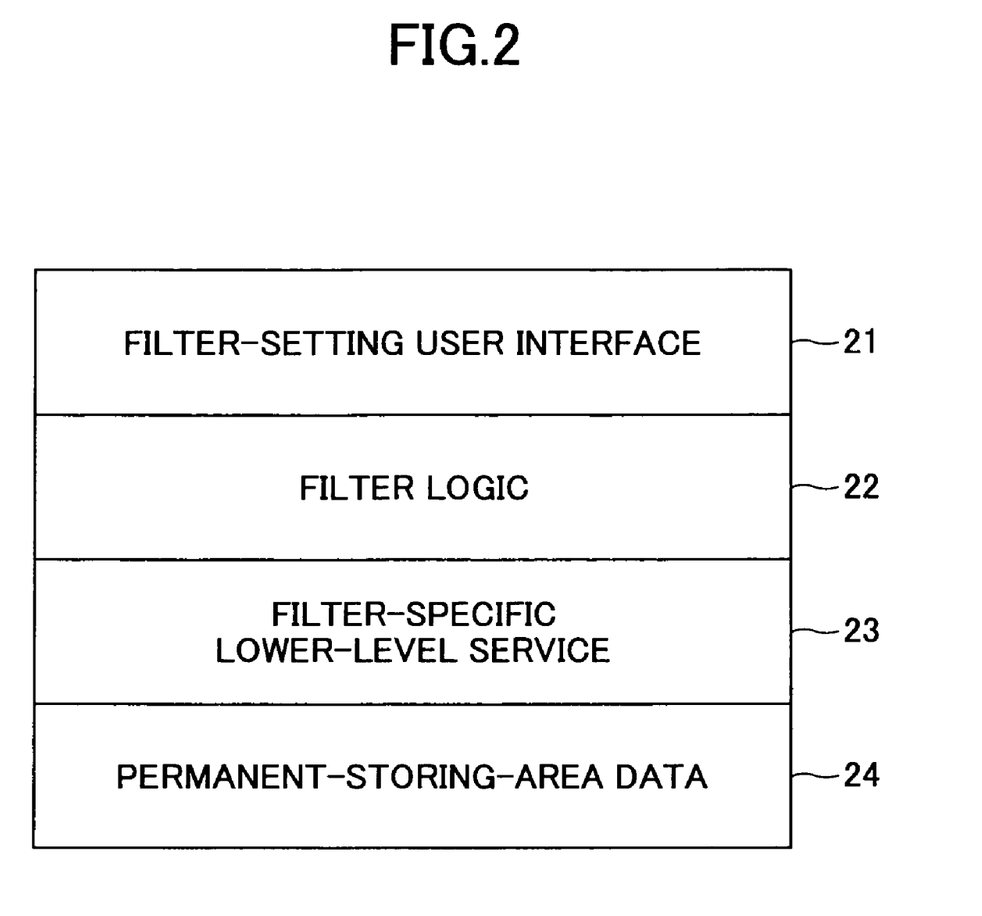
FIG. 2 is a diagram for explaining the components of a filter.

Next, the components of a filter will be described. FIG. 2 is a block diagram showing the components of a filter.

As shown in FIG. 2, the filter includes a filter-setting user interface (UI) 21, a filter logic 22, a filter-specific lower-level service 23, and a permanent-storage-area data 24.

The filter-setting user interface 21 is a program which is configured to display a screen for requesting the user to set up the execution conditions of a filter, on an operation panel of the multi-function peripheral. For example, in a case of a reading filter which is one of input filters, a screen for requesting the user to set up the resolution, the concentration, and the image classification of the reading filter is displayed on the operation panel by the filter-setting user interface 21.

In a case where displaying a screen on the operation panel is performed based on HTML (HyperText Markup Language) data or scripts, the filter-setting user interface may be implemented in a form of HTML data or scripts.

The filter logic 22 is a program in which the logic for performing the functions of the filter is implemented. For example, in a case of a reading filter, the filter logic 22 is a program in which the logic for performing control of the document reading by the scanner is implemented.

The filter-specific lower-level service 23 is a lower-level function (library) needed for performing the filter logic 22. For example, in a case of a reading filter, the filter-specific lower-level service 23 is a lower-level function for controlling the scanner.

The permanent-storage-area data 24 corresponds to the schema definition of the data which needed for being stored in the non-volatile memory of the multi-function peripheral. The permanent-storage-area data 24 is, for example, the setting information of the filter (which may include the defaults of the execution conditions).

Figure 3:
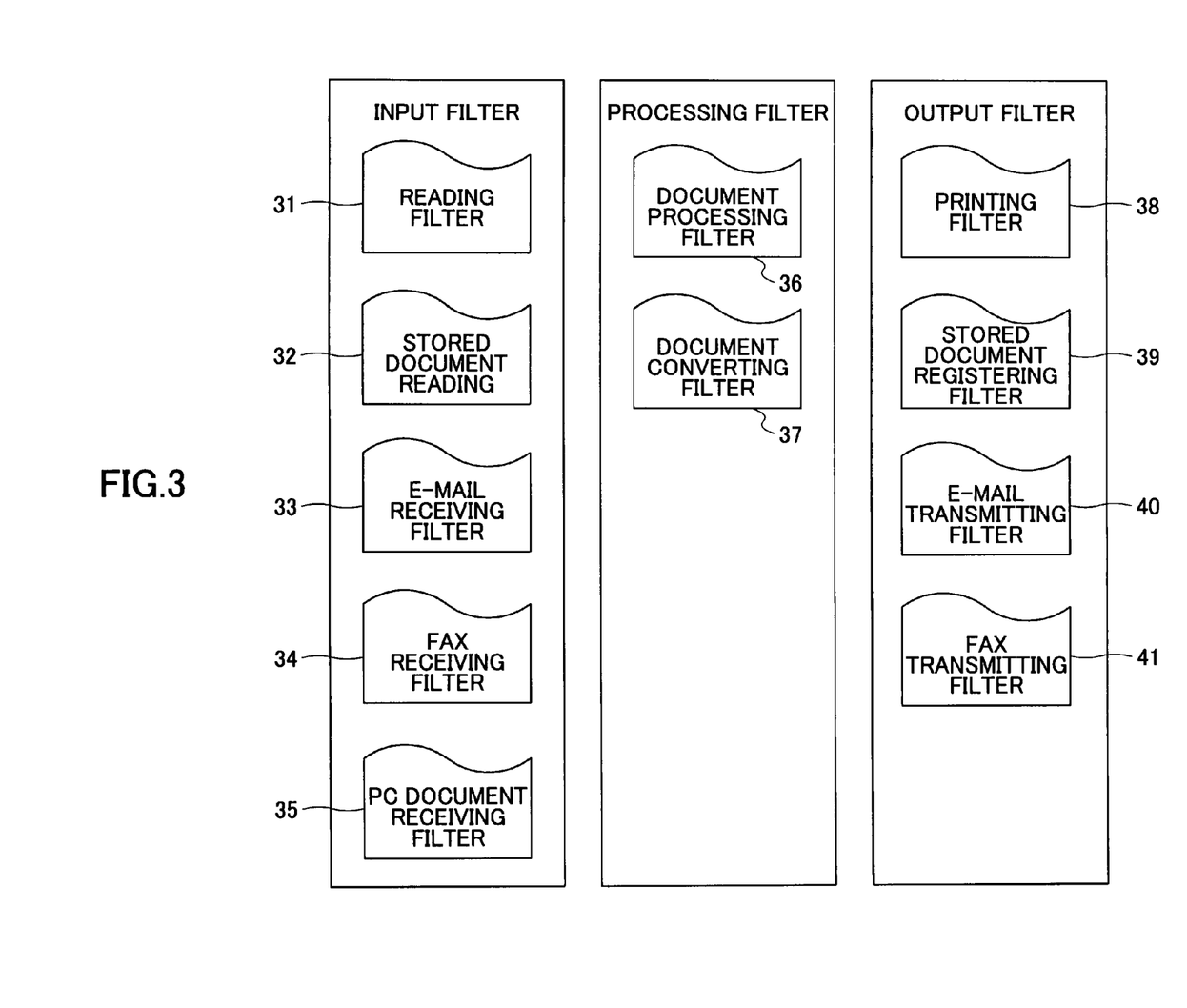
FIG. 3 is a diagram showing examples of an input filter, a processing filter, and an output filter in an embodiment of the invention.

FIG. 3 is a diagram showing examples of the input filter, the processing filter, and the output filter of the multi-function peripheral of this embodiment.

As shown in FIG. 3, the input filter includes a reading filter 31, a stored document reading filter 32, an e-mail receiving filter 33, a FAX receiving filter 34, and a PC document receiving filter 35.

The reading filter 31 controls the reading of image data by the scanner and outputs the read image data. The stored document reading filter 32 reads out a document data (image data) stored in the storage unit of the multi-function peripheral and outputs the read document data. The e-mail receiving filter 33 receives an e-mail via the network (not shown) and outputs the data contained in the e-mail. The FAX receiving filter 34 controls the FAX receiving function of the multi-function peripheral and outputs the received image data. The PC document receiving filter 35 receives a print data from a client personal computer (not shown) via the network and outputs the received print data.

The processing filter includes a document processing filter 36 and a document converting filter 37. The document processing filter 36 performs a predetermined image conversion process (integration, expansion, or reduction) for the input image data and outputs the resulting image data. The document converting filter 37 performs a rendering process. For example, the document converting filter 37 converts the input PostScript data into a bit map data and outputs the bit map data.

The output filter includes a printing filter 38, a stored document registering filter 39, an e-mail transmitting filter 40, and a FAX transmitting filter 41. The printing filter 38 causes the plotter of the multi-function peripheral to output the input image data (printing). The stored document registering filter 39 stores the input image data in the hard disk of the multi-function peripheral. The e-mail transmitting filter 40 attaches the input image data to an e-mail and transmits the e-mail. The FAX transmitting filter 41 causes the FAX transmitting function of the multi-function peripheral to transmit a FAX of the input image data.

Figure 4:
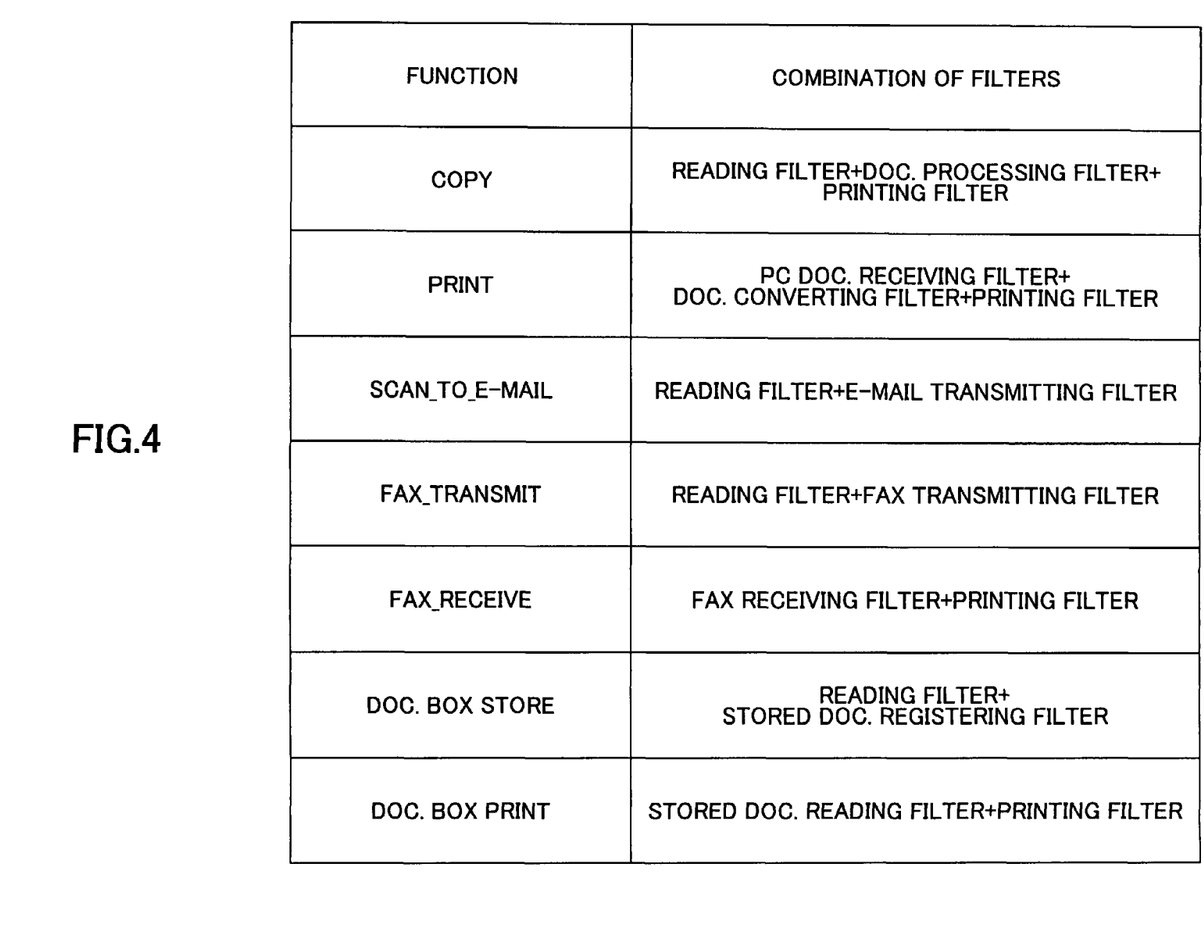
FIG. 4 is a diagram showing examples of the combination of filters for performing each function in a multi-function peripheral of an embodiment of the invention.

FIG. 4 is a diagram showing examples of the combination of the filters for performing each of the functions (applications) in the multi-function peripheral of this embodiment.

For example, the copy function is performed by connecting the reading filter 31 and the printing filter 38. In this case, an image data is read from a document by the reading filter 31, and the image data read by the reading filter 31 is printed by the printing filter 38.

When execution of a process accompanied with the copy function, such as integration, expansion, reduction, etc., is requested, the document processing filter 36 which carries out the process is inserted between the reading filter 31 and the printing filter 38.

The print function (the function to print a document data from a client PC) is performed by connecting the PC document receiving filter 35, the document converting filter 37, and the printing filter 38.

The scan_to_e-mail function (the function to transmit the scanned image data by e-mail) is performed by connecting the reading filter 31 and the mail transmitting filter 40.

The FAX transmitting function is performed by connecting the reading filter 31 and the FAX transmitting filter 34.

The FAX receiving function is performed by connecting the FAX receiving filter 34 and the printing filter 38.

The document box storing function (the function to store the scanned image data in the multi-function peripheral) is performed by connecting the reading filter 31 and the stored document registering filter 39.

The document box printing function (the function to print the document data stored in the multi-function peripheral) is performed by connecting the stored document reading filter 32 and the printing filter 38.

Figure 5:
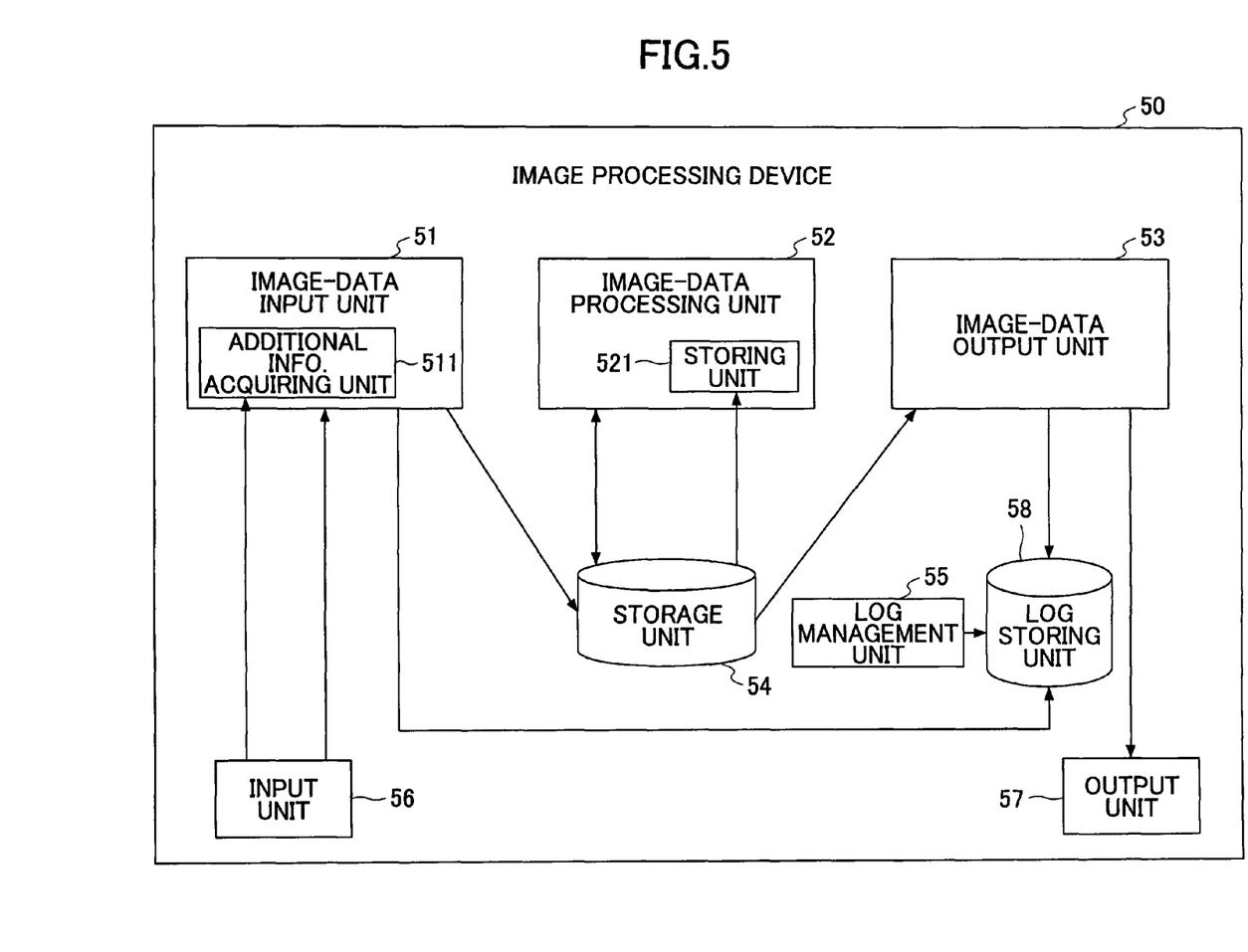
FIG. 5 is a block diagram for explaining the composition of an image processing device of the invention.

FIG. 5 is a block diagram showing the composition of an image processing device of an embodiment of the invention.

As shown in FIG. 5, the image processing device 50 of this present embodiment includes an image-data input unit 51, an image-data processing unit 52, an image-data output unit 53, a storage unit 54, a log management unit 55, an input unit 56, an output unit 57, and a log storing unit 58.

The input unit 56 is a device (hardware) used by the image-data input unit 51 to acquire image data. For example, the input unit 56 is equivalent to the scanner of the multi-function peripheral.

The output unit 57 is a device (hardware) used by the image-data output unit 53 to output image data. For example, the output unit 57 is equivalent to the plotter of the multi-function peripheral.

The log storing unit 58 is a device (hardware) in which a log of output image data output from the image-data output unit 53 is stored.

The image-data input unit 51 performs the process equivalent to the input filter in the above-mentioned pipe and filter architecture. The image-data input unit 51 performs any of the image-data reading process using the scanner, the e-mail receiving process, the FAX receiving process, etc.

The image-data input unit 51 includes an additional information acquiring unit 511. The additional information acquiring unit 511 acquires additional information from the image data read by the input unit 56.

When a color-fill process, a print-cancelling process, or a smeared-image process is subsequently performed by the image-data processing unit 52, the image-data input unit 51 outputs a log of the image data before the color-fill process, the print-cancelling process, or the smeared-image process is performed, to the log storing unit 58.

The image data processing unit 52 performs the process equivalent to the processing filter in the above-mentioned pipe and filter architecture. The image-data processing unit 52 performs a predetermined image conversion process (integration, expansion, reduction, etc.) for the input image data and a rendering process for the input image data.

The image-data processing unit 52 includes a storing unit 521. The storing unit 521 stores the additional information acquired by the additional information acquiring unit 511 into the storage unit 54. For example, when the input unit 56 reads two or more image data items, two or more additional information items are acquired from the image data items by the additional information acquiring unit 511, and the storing unit 521 stores the two or more additional information items from the additional information acquiring unit 511 into the storage unit 54. It is preferred that the additional information items acquired are respectively associated with the corresponding image data items and the storing unit 521 stores each of the respective associations into the storage unit 54 together with the additional information items.

Alternatively, the storing unit 521 may be a component which is separate from the image-data processing unit 52 (it is not necessity that the storing unit 521 is a component of the image-data processing unit 52).

The image-data output unit 53 performs the process equivalent to the output filter in the above-mentioned pipe and filter architecture. The image-data output unit 53 performs any of the printing process, the e-mail transmitting process, the FAX transmitting process, etc. The image-data output unit 53 outputs a log of output image data to the log storing unit 58.

The storage unit 54 performs the process equivalent to the pipe in the above-mentioned pipe and filter architecture. Specifically, the storage unit 54 is a memory device which stores temporarily the processing results from the image-data input unit 51 and the image-data processing unit 52.

In this embodiment, the image-data input unit 51 and the image-data processing unit 52 are arranged to store the processed image data and the additional information in the storage unit 54, and the image-data processing unit 52 and the image-data output unit 53 are arranged to read the processed image data and the additional information from the storage unit 54.

The log management unit 55 manages a log of output image data based on the additional information acquired by the additional information acquiring unit 511. The items of the additional information stored in the storage unit 54 by the storing unit 521 are transmitted from the storage unit 54 to the image-data output unit 53, and the image-data output unit 53 outputs the additional information items to the log storing unit 58 as a log of output image data. In other words, the log management unit 55 manages the items of the additional information stored in the storage unit 54 as a log of output image data. Because the timing of storing the additional information by the storing unit 521 always accords with the timing of receiving the image data from the storage unit 54 in the processing of the image-data processing unit 52, accurate log management can be carried out in which the additional information from the storage unit 54 and the output image data from the image-data output unit 53 are correctly linked together.

Figure 6:
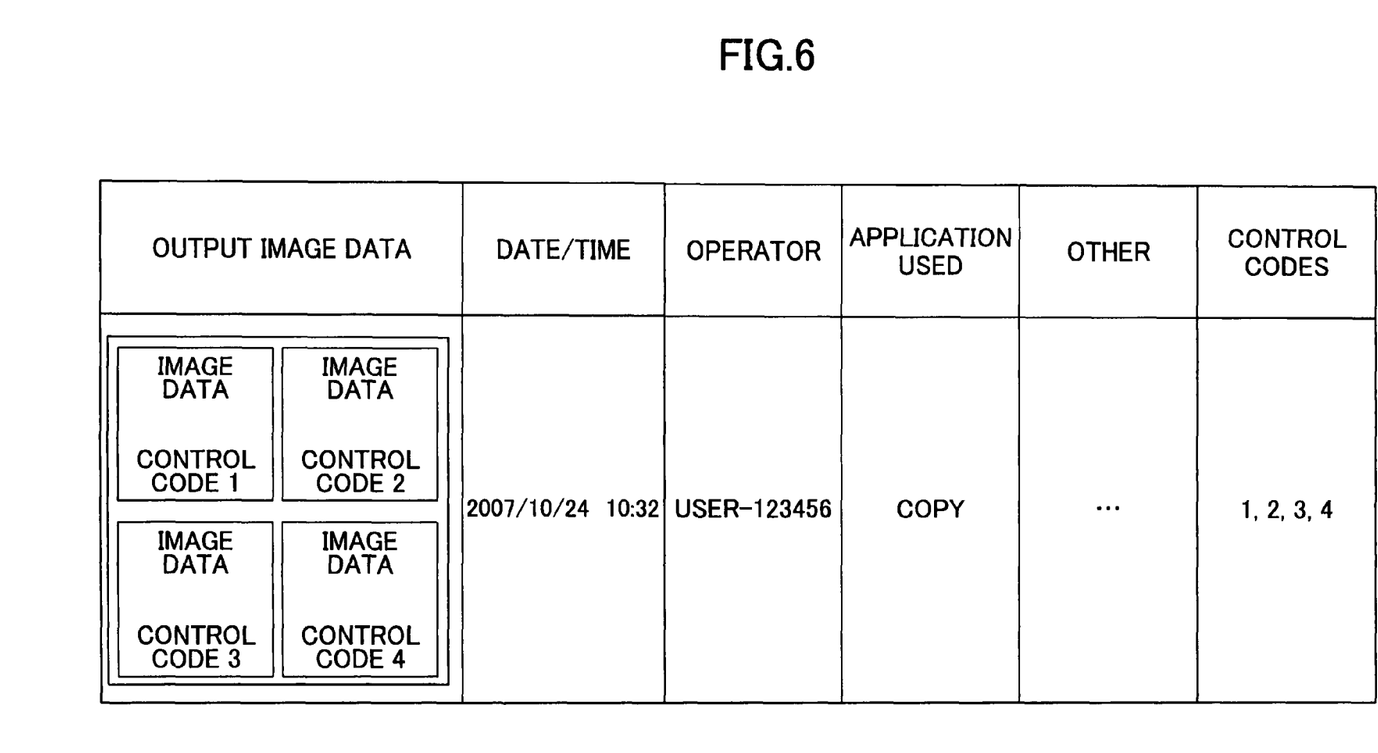
FIG. 6 is a diagram showing an example of a log of output image data after the multi-function peripheral of the present embodiment performs an integrated copy process.

FIG. 6 shows an example of a log of output image data. When an integrated copy process is performed using four input image data items to generate an output image data, a log of the output image data is as shown in FIG. 6.

In the example of FIG. 6, the additional information in the log includes control codes, and each of the control codes specifies a process to be performed for one of the input image data items by any of the image-data input unit 51, the image-data processing unit 52, and the image-data output unit 53.

The log management unit 55 arranges the control codes, which correspond to the input image data items contained in the output image data, in the left-to-right, up-to-down sequence. Namely, the control codes are arranged in order of 1, 2, 3, and 4 as shown in FIG. 6.

The above-mentioned arrangement of the control codes in the log allows the positions of the input image data items contained in the output image data to be respectively associated with the control codes acquired from the input image data items by the additional information acquiring unit 511. Thereby, accurate log management can be carried out because of the above-mentioned arrangement of the control codes.

The log management unit 55 manages a log of output image data based on the output image data containing the processed image data after the processes according to the control codes are performed for the input image data items by the image-data input unit 51, the image-data processing unit 52 and the image-data output unit 53, and based on the input image data items before the processes are performed.

Figure 7:
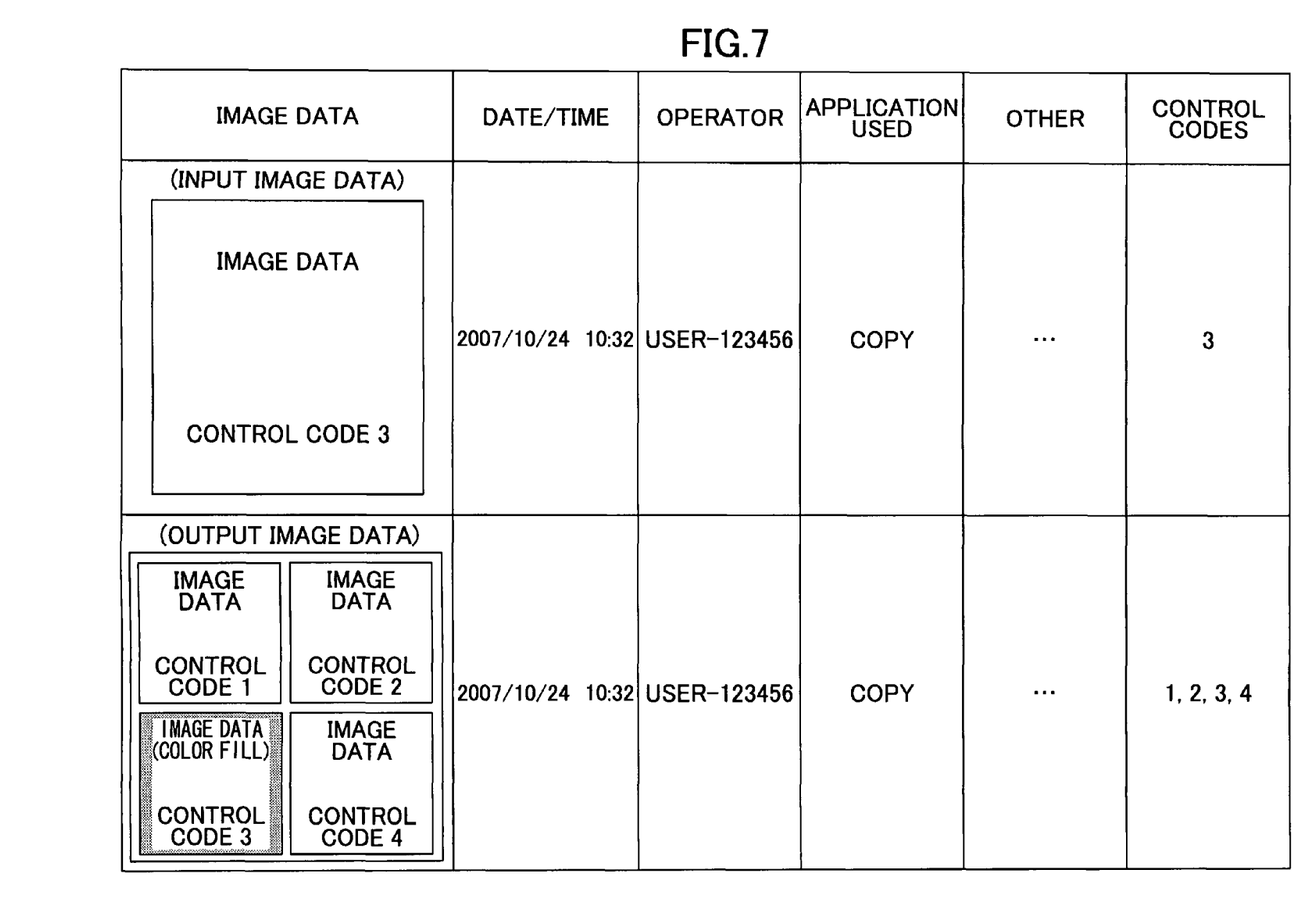
FIG. 7 is a diagram showing an example of a log of output image data after the multi-function peripheral of the present embodiment performs an integrated copy process.

FIG. 7 shows an example of a log of output image data after the multi-function peripheral of this embodiment performs an integrated copy process using four input image data items to generate an output image data.

Suppose that, in the example of FIG. 7, the process to be performed by the image-data processing unit 52 which process is indicated by the control code 3 is a color-fill process of image data. In a case of the integrated copy process, the document processing filter 36 constitutes the image-data processing unit 52.

The image-data output unit 53 outputs the log of the output image data to the log storing unit 58. When the color-fill process is performed by the image-data processing unit 52 as in this example, reading the original image data from the log is impossible.

To resolve the problem, the image-data input unit 51 (which is constituted by the reading filter 31 in the case of the integrated copy process) outputs a log of the image data before the color-fill process is performed to the log storing unit 58, so that the original image data may be read from this log.

Because the image data before the color-fill process is performed can be checked from the log in the log storing unit 58 even after the color-fill process of the image data is performed, it is possible to perform accurate log management that is faithful to the processing results of the respective filters according to the control codes.

The above-mentioned color-fill process may include a process which paints out the original image data contained in the output image data in one color (which includes also a process of converting document image data into blank image data), as well as a process which fills the original image data with a mosaic pattern in order to make the content of the original image data illegible.

In a case in which a predetermined control code is extracted from the original image data, the image-data output unit 53 may not output the output image data and the log management unit 55 may not output a log of the output image data to the log storing unit 58. To resolve the problem, the image-data input unit 51 may be arranged to output a log of the received image data (which is the processing object) to the log storing unit 58 in that case.

This arrangement of the image-data input unit 51 makes it possible to carry out accurate log management for the image data read by the input unit 56, even if there is no output image data.

In an embodiment of the image processing device of the invention, when the additional information acquiring unit 511 is not able to acquire additional information from the input image data, the log management unit 55 manages information indicating that no additional information is acquired, as a log of the output image data.

Figure 8:
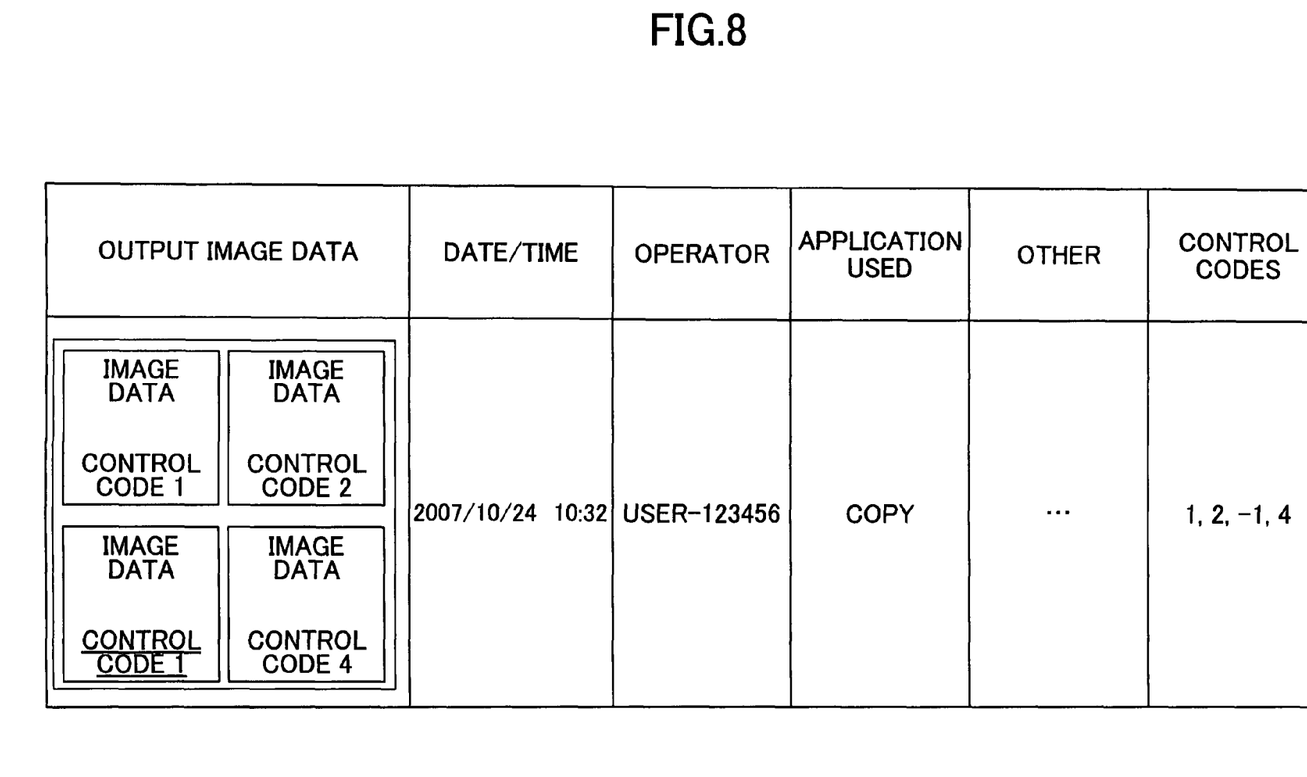
FIG. 8 is a diagram showing an example of a log of output image data after the multi-function peripheral of the present embodiment performs an integrated copy process.

FIG. 8 shows an example of a log of output image data after the multi-function peripheral of the present embodiment performs an integrated copy process. Suppose that, in the example of FIG. 8, the additional information acquiring unit 511 cannot acquire any additional information from the lower-left input image data item at the contained in the output image data.

In this example, the information indicating that the additional information acquiring unit 511 cannot acquire any additional information from the input image data item is expressed by the control code which is set to −1 as shown in FIG. 8.

Even when no additional information is acquired by the additional information acquiring unit 511, the information (the control code which is set to a predetermined value) indicating that no additional information is acquired can be managed as a log of the output image data, and it is possible to carry out accurate log management that is faithful to the output image data in which the above information is included.

Next, the hardware composition of the multi-function peripheral which is an embodiment of the image processing device of the invention will be described.

Figure 9:
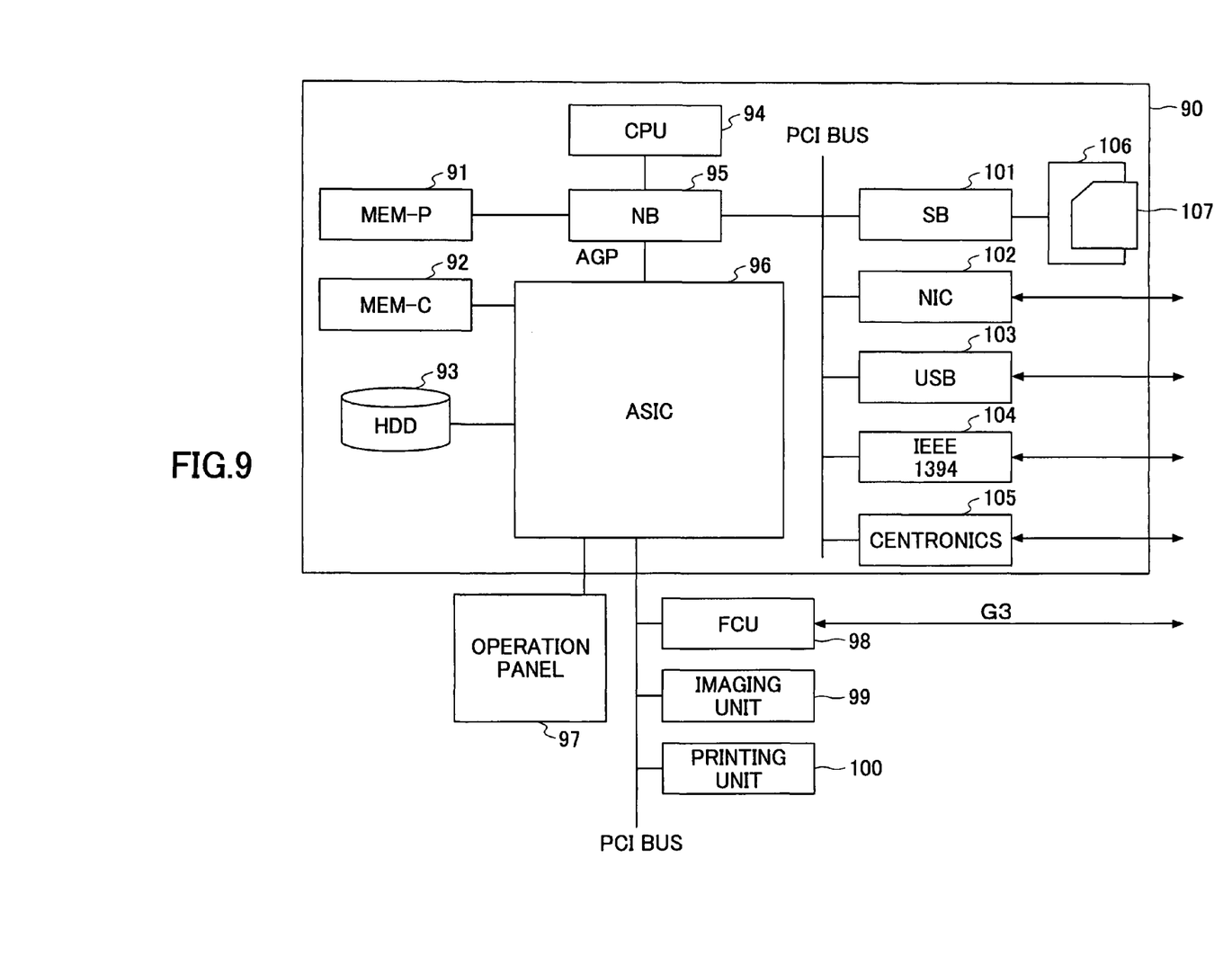
FIG. 9 is a block diagram showing the hardware composition of a multi-function peripheral of an embodiment of the invention.

FIG. 9 is a block diagram showing the hardware composition of a multi-function peripheral of an embodiment of the invention.

As shown in FIG. 9, the hardware of the multi-function peripheral of this embodiment includes a controller 90, an operation panel 97, a facsimile control unit (FCU) 98, an imaging unit (scanner) 99, and a printing unit (plotter) 100.

The controller 90 includes a CPU (central processing unit) 94, an ASIC (application-specific integrated circuit) 96, an NB (north bridge) 95, an SB (south bridge) 101, an MEM-P 91, an MEM-C 92, an HDD (hard disk drive) 93, a memory card slot 106, an NIC (network interface controller) 102, a USB (universal serial bus) device 103, an IEEE (the Institute of Electrical and Electronics Engineers) 1394 device 104, and a Centronics device 105.

The CPU 94 is an IC (integrated circuit) designed for performing various kinds of information processing. The ASIC 96 is an IC designed for performing various kinds of image processing. The NB 95 is the north bridge of the controller 90. The SB 101 is the south bridge of the controller 90. The MEM-P 91 is the system memory of the multi-function peripheral. The MEM-C 92 is the local memory of the multi-function peripheral. The HDD 93 is the storage of the multi-function peripheral. The memory card slot 106 is the slot for setting the memory card 107. The NIC 102 is a controller for performing network communications in accordance with a MAC (media access control) address. The USB device 103 is a device for detecting connection of a device conforming to the USB specifications. The Centronics device 105 is a device for detecting connection of a device conforming to the Centronics specification.

The operation panel 97 is the hardware (an operation unit) for enabling an operator to input instructions to the multi-function peripheral, as well as the hardware (a display unit) for enabling an operator to receive messages output from the multi-function peripheral.

For example, the software of the multi-function peripheral in an embodiment of the invention is stored in the MEM-C 92, and, when executed by the CPU 94, the software from the MEM-C 92 is loaded to the MEM-P 91 and execution of the software causes the CPU 94 to perform any of the functions of the multi-function peripheral.

The procedure of the respective filters in the multi-function peripheral of this embodiment will be explained with reference to FIGS. 6 to 8, and FIG. 10.

Figure 10:
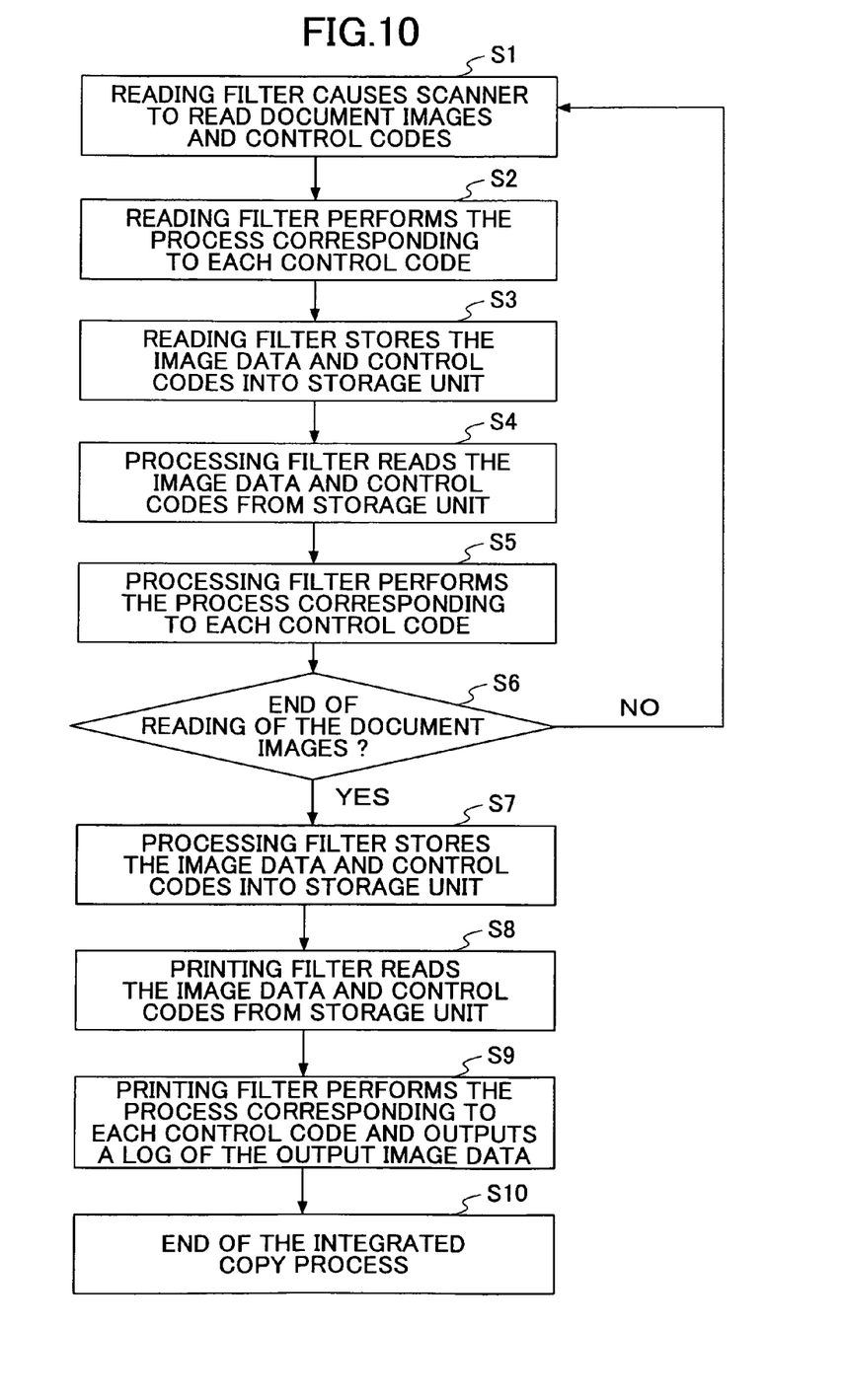
FIG. 10 is a flowchart for explaining the procedure of each filter when the multi-function peripheral of the present embodiment performs an integrated copy process.

FIG. 10 is a flowchart for explaining the procedure of each of the image-data input unit 51, the image-data processing unit 52, and the image-data output unit 53 in the present embodiment.

With reference to the example of FIG. 10, the procedure of each filter when the multi-function peripheral of the present embodiment performs an integrated copy function using four input image data items to generate a single output image data for printing the output image data will be described.

If a user selects the integrated copy operation from the operation panel 97 of the multi-function peripheral, the reading filter 31, the document processing filter 36 and the printing filter 38 which are relevant to the copy function as shown in FIG. 4 are chosen. The respective filters perform the processes relevant to the integrated copy operation as follows.

In step S1, the reading filter 31 causes the scanner (the input unit 56) to read the image data of one of document images, and the additional information acquiring unit 511 acquires a control code (additional information) from the image data.

In step S2, the reading filter 31 performs the process corresponding to the control code acquired by the additional information acquiring unit 511.

Next, in step S3, the reading filter 31 stores the image data and the control code into the storage unit 54.

In step S4, the document processing filter 36 reads the image data and the control code from the storage unit 54.

In step S5, the document processing filter 36 performs the process corresponding to the control code. In this embodiment, the integrated copy process is performed so that the four input image data items are integrated into one output image data. For this purpose, the document processing filter 36 performs the reduction/integration process of image data in the step S5.

In a case in which the process corresponding to the control code is a color-fill process of image data, the document processing filter 36 performs the color-fill process of image data in addition to the reduction/integration process of image data.

In step S6, it is determined whether the reading of the document images by the scanner is completed.

When the reading of the document images by the scanner is not completed in the step S6, the reading filter 31 and the document processing filter 36 repeat performing the steps S1 to S5 for the following one of the document images. In this embodiment, the performance of the steps S1 to S5 is repeated until all the four input image data items are read out.

The document processing filter 36 is arranged to store control codes, corresponding to additional information items relevant to the input image data items before the reduction/integration process is performed, into the storage unit 54. In this manner, the control codes are stored in the storage unit 54, and the additional information corresponding to the output image data to be printed in a subsequent process can be correctly managed.

The processed image data items after the reduction/integration process is performed are also stored in the storage unit 54 by the document processing filter 36.

On the other hand, when the reading of the image data of the document images by the scanner is completed in the step S6, the document processing filter 36 in step S7 stores the image data items after the reduction/integration process is performed and the four control codes into the storage unit 54 by the storing unit 521.

In step S8, the printing filter 38 reads the image data items after the reduction/integration process is performed and the four control codes from the storage unit 54.

Next, in step S9, the printing filter 38 performs the process corresponding to each control code. The printing filter 38 of this embodiment causes the plotter to print the output image data.

In step S9, the printing filter 38 outputs a log of the output image data to the log storing unit 58. For example, the log of the output image data is as shown in FIG. 6. In the example of the log shown in FIG. 6, the integrated image data of the four document images, the date/time at which the log was output, the operator, the application used in the multi-function peripheral, other information, and the control codes 1, 2, 3 and 4 corresponding to the four document images are included.

As shown in FIG. 6, the control codes corresponding to the input image data items contained in the output image data are arranged in the log in the left-to-right, top-to-down order, so that the positions of the input image data items contained in the output image data are associated with the corresponding control codes acquired by the additional information acquiring unit 511. By using the log as shown in FIG. 6, it is possible to carry out accurate log management in which the positions of the input image data items contained in the output image data are associated with the corresponding control codes acquired by the additional information acquiring unit 511.

Moreover, when the document processing filter 36 performs the color-fill process of the image data of the third document image, the printing filter 38 outputs the log as shown in FIG. 7 to the log storing unit 58. In the log shown in FIG. 7, the contents of the color-filled image data are illegible.

To resolve the problem, when the color-fill process is performed by the document processing filter 36, the reading filter 31 which is the preceding process to the color-fill process is arranged to output a log of the input image data before the color-fill process is performed, to the log storing unit 58. Thereby, even when the color-fill process of the image data is performed, the contents of the image data before the color-fill process is performed can be checked from the log. Therefore, it is possible to carry out accurate log management that is faithful to the processing results of the respective filters corresponding to the control codes.

FIG. 8 shows an example of a log when no additional information can be acquired by the additional information acquiring unit 511. In this case, the control code of the input image data item from which no additional information can be acquired is set to −1.

Because the information (the control code of −1) indicating that no additional information was acquired can be managed as a log, it is possible to carry out the log management that is accurate to the output image data, even when any additional information cannot be acquired by the additional information acquiring unit 511.

As shown in FIG. 10, when all the steps of the integrated copy process are performed, the procedure of the filters in the multi-function peripheral is terminated in step S10.

The present invention is not limited to the specifically disclosed embodiments, and variations and modifications may be made without departing from the scope of the present invention.

The present application is based on Japanese patent application No. 2007-286728, filed on Nov. 2, 2007, and Japanese patent application No. 2008-258780, filed on Oct. 3, 2008, the contents of which are incorporated herein by reference in their entirety.

What is claimed is:

1. An image processing device which manages a log of output image data, comprising:
   an additional information acquiring unit configured to acquire, from a plurality of input image data items, respective items of additional information relevant to the plurality of input image data items; and
   a log management unit configured to manage a log of output image data,
   wherein when the plurality of input image data items are integrated into the output image data, the log management unit manages the respective items of additional information acquired from the plurality of input image data items contained in the output image data, as the log of the output image data,
   wherein each of the additional information items includes a control code which indicates a process to be performed for corresponding one of the input image data items,
   wherein the log management unit is configured to manage the log of the output image data to include (1) the input image data items before processes indicated by respective control codes in the additional information items are performed and (2) the input image data items after the processes indicated by the respective control codes are performed,
   wherein the input image data items before the processes are performed are different from the input image data items after the processes are performed.

2. The image processing device according to claim 1, further comprising:
   a storing unit which stores the respective items of additional information acquired by the additional information acquiring unit, wherein the log management unit is configured to manage the respective items of additional information stored in the storing unit as the log of the output image data.

3. The image processing device according to claim 1, wherein the log management unit is configured to manage the input image data items and the acquired additional information items associated with the input image data items, as the log of the output image data.

4. The image processing device according to claim 1, wherein, when the additional information acquiring unit is not able to acquire additional information from an input image data item, the log management unit manages information indicating that no additional information is acquired, as the log of the output image data.

5. An image processing method which manages a log of output image data, comprising:
   an additional information acquiring step of acquiring, by a computer processing unit (CPU), from a plurality of input image data items, respective items of additional information relevant to the plurality of input image data items; and
   a log management step of managing, by the CPU, a log of output image data,
   wherein, when the plurality of input image data items are integrated into the output image data, the log management step is configured to manage respective items of additional information acquired from the plurality of input image data items contained in the output image data, as the log of the output image data,
   wherein each of the additional information items includes a control code which indicates a process to be performed for corresponding one of the input image data items,
   wherein the log management step manages the log of the output image data to include (1) the input image data items before processes indicated by respective control codes in the additional information items are performed and (2) the input image data items after the processes indicated by the respective control codes are performed,
   wherein the input image data items before the processes are performed are different from the input image data items after the processes are performed.

6. The image processing method according to claim 5, further comprising:
   a storing step of storing, by the CPU, the respective items of additional information acquired in the additional information acquiring step, in a storing unit,
   wherein the log management step is configured to manage the respective items of additional information stored in the storing unit as the log of the output image data.

7. The image processing method according to claim 5, wherein the log management step is configured to manage the input image data items and the acquired additional information items associated with the input image data items, as the log of the output image data.

8. The image processing method according to claim 5, wherein, when additional information is not able to be acquired from an input image data item in the additional information acquiring step, the log management step is configured to manage information indicating that no additional information is acquired, as the log of the output image data.

9. A non-transitory computer-readable recording medium storing an image processing program which, when executed by a computer, causes the computer to perform an image processing method which manages a log of output image data, the image processing method comprising:
   an additional information acquiring step of acquiring, from a plurality of input image data items, respective items of additional information relevant to the plurality of input image data items; and
   a log management step of managing the log of output image data,
   wherein, when the plurality of input image data items are integrated into the output image data, the log management step is configured to manage respective items of additional information acquired from the plurality of input image data items contained in the output image data, as the log of the output image data.
   wherein each of the additional information items includes a control code which indicates a process to be performed for corresponding one of the input image data items,
   wherein the log management step manages the log of the output image data to include (1) the input image data items before processes indicated by respective control codes in the additional information items are performed and (2) the input image data items after the processes indicated by the respective control codes are performed,
   wherein the input image data items before the processes are performed are different from the input image data items after the processes are performed.

10. The non-transitory computer-readable recording medium according to claim 9, wherein the image processing method further comprises:

a storing step of storing the respective items of additional information acquired in the additional information acquiring step, in a storing unit, wherein the log management step is configured to manage the respective items of additional information stored in the storing unit as the log of the output image data.

* * * * *